United States Patent Office 3,162,537
Patented Dec. 22, 1964

3,162,537
PROCESS FOR REMOVAL OF SUGARS BY ENZYMATIC ACTION
Don Scott, Chicago, Ill., assignor to Fermco Laboratories, Inc., a corporation of Illinois
No Drawing. Filed Feb. 8, 1962, Ser. No. 171,804
8 Claims. (Cl. 99—113)

This invention relates to an enzymatic process and the products formed by the process. More particularly, it relates to a process for removing glucose from aqueous mediums by the use of an enzyme system containing glucose oxidase. Still more particularly, it relates to the desugarization of eggs and other food products.

The process of the present invention comprises subjecting a liquid product containing sugar and proteinaceous material to the action of an enzyme system having glucose oxidase activity or glucose oxidase and catalase activity, at a temperature in the range between about 30° F. and 65° F., and introducing oxygen into the mixture in quantities exceeding those required for reaction and for saturation of the liquid.

Numerous attempts have been made in the past to remove naturally occurring sugars from foods to enhance storage stability, to prevent reactions which impart off-colors and the like. For example, dried egg albumen prepared by the usual dehydration processes, such as freeze drying, fluff-drying, etc., tend to undergo a reaction even in the dry state which results in the development of a brownish color which limits the commercial acceptability thereof. It is generally considered that this browning or off-color is the result of a reaction between the glucose and a proteinaceous material normally contained in the egg whites.

One method suggested for removal of the glucose from egg whites prior to dehydration has been the removal of sugars by enzymatic action carried out at a temperature of generally about 86° F. as an optimum balance between a temperature favoring a high degree of enzyme activity without favoring bacterial growth for a reaction period which must run for from 3 to 8 hours. In this process the hydrogen peroxide precursor for introduction of oxygen is added in the form of successive increments, the increments containing successively decreasing amounts of hydrogen peroxide so as to minimize the foaming.

In Scott Patent No. 2,758,934, it is pointed out that the conversion of glucose to gluconic acid by means of an enzyme system containing glucose oxidase activity can be a first order chemical reaction under certain operating conditions. The conditions of primary importance in attaining this first order reaction are concentration of hydrogen peroxide in the medium under conversion and the temperature of the medium.

While it might be anticipated that the desugarization could be carried out at temperatures lower than those customarily employed in the processing heretofore, namely, 75° F. to 85° F., it would be expected that the lowering of the temperature of reaction by 18° F. would result in a lengthening of the time required to effect a predetermined reduction in sugar content such that the total time required would be doubled. Consequently, a drop of 36° F. would be expected to result in a quadrupling of the time required for the same degree of desugarization.

Now it has been discovered that liquid products containing sugars and proteins can be treated with enzyme preparations containing aldose oxidase activity to desugarize the product in a substantially shorter time than would be expected on the basis of enzyme kinetics. The liquid product is desugarized in accordance with this invention by mixing therewith an enzyme preparation containing aldose oxidase activity maintaining the mixture at a temperature in the range between about 30° F. and 65° F. and supplying oxygen to the admixture in at least stoichiometric amounts for reaction and under conditions whereby the gases in the admixture are present in quantities exceeding those required for reaction and for saturation of the liquid.

In one embodiment of the invention, for example, as applied to the desugarization of egg whites, the liquid product containing sugar, protein and fat is desugarized by mixing therewith an enzyme preparation containing glucose oxidase activity, maintaining the mixture at a temperature at which fat will be present as discreet globules, i.e., as viscous liquid or semi-sold, supplying hydrogen peroxide to the mixture in excess of the stoichiometric amounts of supplying oxygen for the conversion of glucose to gluconic acid so that the excess gas rising as bubbles through the mixture will create foam by means of which suspended particles of fat, bacteria and foreign matter are separated from the mixture.

If the process is carried out under superatmospheric gas pressure, over at least a portion of the period require dfor desugarization, the pressure may be reduced periodically or at the end of the pressurized desugarization operation to cause a foaming action which will float up the fat content of the mixture.

The treatment of a liquid food product in accordance with the procedure set forth above has numerous advantages. One of the most important advantages is from the bacteriological viewpoint. For example, a food product such as egg white need not be held in a warm condition at any time between its being in the liquid and dry states, except during pasturization, and therefore it need never be at a temperature which approaches optimum for the growth of microorganisms. Consequently, the products of this process have a much lower bacteria count and can be produced Salmonella-free, as far as can be determined by the standard tests currently in use. In view of operation under conditions virtually arresting the growth of microorganisms, one can extend the enzyme desugarization reaction over a long period of time and thereby lessen the requirements for the relatively expensive enzyme composition with the result that costs of the process can be appreciably lowered.

When it is desired to produce an albumen of improved functional properties as regards emulsification or whipping from a product which contains fat, the process of treatment due to the foaming during processing of the enzyme containing mixture, has fat and other suspended materials such as bacteria, physically removed from the food product. Thus, the fat which could be detrimental will not be carried through into the end product.

The process of this invention may be carried out on a variety of food products such as eggs, milk, and the like, and may be effected under a variety of conditions depending upon the particular results desired.

The enzymatic conversion of an aldose such as glucose, by glucose oxidase requires the presence of oxygen. In accordance with a preferred embodiment of this invention, this oxygen is supplied by the reaction of catalase and hydrogen peroxide in the medium. The catalase decomposes hydrogen peroxide to liberate oxygen. However, it will be apparent that, if desired, substances other than catalase can be employed which are known to catalyze the decomposition of hydrogen peroxide. Chemical catalysts such as compounds of iron, manganese, etc., may be useful for the purpose.

Hydrogen peroxide has been specifically mentioned but it will be understood that the hydrogen peroxide can be replaced by compounds capable of releasing hydrogen peroxide within the medium being treated. Such substances as urea peroxide, calcium peroxide, the perborates, etc., may be used provided they do not introduce contaminants, for example, such as would be objectionable in foods.

While it is preferred to use hydrogen peroxide, it will be apparent that other sources of oxygen may be utilized. For example, oxygen gas or air may be introduced into the reacting mixture, one mode of operation being to operate in a closed vessel with oxygen under pressure. For the purposes of this invention, it is desirable to maintain the medium essentially saturated with oxygen so that the low temperature reaction rate becomes a function of the residual sugar content and varies inversely with enzyme concentration.

At the time of reaction, the hydrogen ion concentration of the reacting mixture has an appreciable effect on the rate of the utilization of oxygen in the reaction. For most proteinaceous mediums, it is preferred to carry out the conversion of glucose to gluconic acid at a pH of less than 8.0 and generally in the range between about pH 5.0 and 7.5. For example, in the treatment of egg whites the solids of which consist predominantly of albumin, it may be desirable to maintain the pH above 6.3 to prevent separation of mucin and mucoid fractions. It will be recognized that some food products such as egg yolk have a pH naturally in the range of between about 6 and about 7 and will not require pH adjustment.

Adjustment of the pH of the medium when necessary, may be accomplished by the use of organic acids or inorganic acids. Useful organic acids are citric acid, lactic acid, acetic acid and the like. Useful inorganic acids are phosphoric acid, hydrochloric acid and the like.

In a preferred embodiment of the invention as applied to egg whites intended for use in angel food cake, citric acid is added to the egg white medium being held at a temperature of about 50° F. in quantities to produce a pH in the range between 7.0 and 7.5. If the medium consists of a 1,000 pound base of liquid egg whites, the adjustment requires the use of about one pound of citric acid. The medium is maintained under mild agitation conditions and to the acidified egg white is added 600 ml. of 35% hydrogen peroxide and one standard pound of glucose oxidase enzyme (75,000 units of glucose oxidase). When the foaming of the medium indicates that the reaction is subsiding, hydrogen peroxide is added at a rate designed to maintain a foam. This foam physically removes fat to the skimmed off foam layer. After about 10 to 12 hours of enzyme action, desugarization is complete. Were this albumen destined for use in candy the desugarized albumen might then be further acidified with lactic acid to a pH of about 5.0 prior to drying. When acidified to pH 5.0, little or no pH rise will be experienced upon drying. If the albumen is not acidified the further the pH is from 5.0, the greater will be the tendency for the pH to rise on drying, subject of course to variation due to drier hold-up time as well.

In order to regulate the pH of the dried egg white, adjustments are commonly made on the liquids prior to drying. One approach commercially employed is to add buffering salts, such as phosphates, to minimize the pH use on drying. While buffering salts can accomplish the desired pH control, another method useful in conjunction with our invention is to raise the pH above the desired pH of the powder by means of a volatile alkali such as ammonium hydroxide. Adjustment, for instance, of the liquid from pH 6.3 after desugarization to 9.0 with 28% ammoninum hydroxide and then spray drying has resulted in a superior albumen with a final pH when reconstituted of 7.4.

The amount of glucose oxidase product employed depends upon the activity of the enzyme product. This amount may be readily determined in view of the standardization of the activity of glucose oxidase enzymes. One unit of glucose oxidase may be defined as that amount of enzyme which will cause the uptake of 10 cubic millimeters of oxygen per minute at 30° C. under assay conditions described by Scott, Journal of Agricultural and Food Chemistry, volume 1; 727–30 (1953).

For a more complete understanding of this invention, there is set forth a number of examples which illustrate the preparation of desugarized food products and the methods by which the process of this invention may be carried out.

*Example I*

16,000 pounds of egg white are adjusted to 58° F. and 16 pounds of citric acid monohydrate, which was previously dissolved in 20 gallons of water, was added slowly. The pH was dropped thereby to 7.3. 10 liters of 35% hydrogen peroxide was then mixed in. After about 20 minutes 1.6 liters of "Ovazyme" glucose oxidase-catalase enzyme having 1,200,000 units of glucose oxidase was added and peroxide addition was started at the rate of 4 liters per hour for the first 3 hours. The rate of hydrogen peroxide addition was reduced to 2 liters per hour for the next 2½ hours and to 1 liter per hour for the next 2½ hours. The peroxide rate was again cut to 600 ml. per hour until a qualitative test for reducing sugar was negative. Total time for desugarization was 11 hours from the time of enzyme addition.

*Example II*

To 15,000 pounds liquid egg white at 55° F. was added 15 pounds of citric acid, dropping the pH to 7.4. Then 9 liters of 35% hydrogen peroxide was added. After mixing in the peroxide, 1,500 ml. of a liquid glucose oxidase preparation (containing 750 units per ml.) was then added. Agitation was continuous by means of a paddle type agitator at 30 r.p.m. Starting just after the addition of the glucose oxidase enzyme solution, 35% hydrogen peroxide was added continuously at the rate of 75 ml. per minute for the first 2½ hours. The rate of peroxide addition was then cut to 38 ml./minute and, after another 2½ hours it was reduced to 19 ml./minute. After another 2½ hours, it was reduced to 10 ml./minute. After a total elapsed processing time of 10 hours glucose test showed less than 0.1% on a dry basis.

*Example III*

2,000 pounds of whole egg was pasteurized at 147° F. for 2½ minutes and cooled to 54° F. 1,200 ml. of hydrogen peroxide 35% was then added. This was followed shortly with 250 ml. of glucose oxidase enzyme solution (containing 750 units per ml.) and peroxide addition was initiated at the rate of 12 to 13 cc. per minute. After 6½ hours a qualitative test indicated glucose to be absent and the egg was dried by spraying. Examination of the finished product showed a moisture content of 3%, glucose less than .01%, a pH of 7.4, Salmonella and coliform, negative, and a viable count of 700 organisms per gram. Palatability was 7.5.

*Example IV*

2,000 pounds of yolk was pasteurized at 142° F. for 4 minutes and cooled to 60° F. 1 liter of 35% hydrogen peroxide was added and mixed in. Then 200 ml. of glucose oxidase enzyme solution (containing 750 units per ml.) was added and the continuous addition of hydrogen peroxide was carried out at the rate of 10 ml. per minute.

After 4 hours a qualitative test showed negative for sugar. The product was then frozen.

*Example V*

2,000 pounds of whole egg was pasteurized at 147° F. for 2½ minutes then cooled to 50° F. and 225 ml. glucose oxidase-catalase enzyme solution (containing 750 units per ml.) was then added. Hydrogen peroxide was added at the rate of 12 cc. per minute for 12 hours. A total of 21 pounds of 35% hydrogen peroxide was used. The glucose level on the liquid egg was 0.0025%. The product was then spray dried to a moisture content of 2.8%. The pH of the powder was 7.4 Glucose content less than .01% on the powder. The powder was examined bacteriologically and found to be negative in Salmonella and coliforms and to have a total bacteria count at 22° C. of under 3,000 organisms per gram. (This count would be equivalent to a count of about 500 per gram if determined at 37° C.) United States Department of Agriculture specification SS for dry whole egg specifies a maximum acceptable total count of 50,000 average for a three hour desugarization time. Good commercial practice under these specifications results in counts in the range of 7,000 to 25,000 organisms per gram when determined at 37° C.

*Example VI*

2,000 gallons albumen was split between two jacketed tanks. One vat was warmed (via coils in the jacket) to the conventional 85° F. and the other left at 48° F. pH adjustments on both were identical. Each was desugarized and then the bacteria counts and fat determined. It was found that the vat desugarized warm had 251,000,000 bacteria per ml. of liquid, and 0.03% fat while the vat desugarized cold had only 8,100 bacteria per ml., and a fat content of only 0.01%.

*Example VII*

16,000 pounds yolk at 40° F. Added 14,000 ml. 35% $H_2O_2$. After 20 minutes, 3,000 ml. glucose oxidase-catalase enzyme medium (containing 750 units per ml.) added. Then peroxide addition started at rate of 90 ml. per minute. After 6 hours it was tested and found to be negative in sugar.

While this invention has been described with particular reference to the removal of glucose from food products, it also has broader applicability for the removal of other aldoses, such as xylose, mannose, galactose, arabinose and the like. In such cases an aldose oxidase is employed as the principal enzyme which is capable of converting the particular aldose to the corresponding sugar acid.

The foregoing description is given for clearness of understanding only and no unnecessary limitations should be understood therefrom for some modifications will be obvious to those skilled in the art.

I claim:

1. The process of removing an aldose from liquid whole egg containing fat formable into discrete globules at temperatures in the range between about 30° F. and about 65° F., which comprises admixing with said liquid whole egg when said liquid whole egg is being maintained at a temperature in the range between about 30° F. and about 65° F., an enzyme system having aldose oxidase activity, saturating the liquid admixture with respect to oxygen and maintaining discharge of gas from said admixture in quantities to maintain foaming throughout the reaction period, whereby particulate material is floatable from the admixture and removable from the system.

2. The process of removing glucose from liquid whole egg containing fat formable into discrete globules at temperatures in the range between about 30° F. and about 65° F., which comprises admixing with said liquid whole egg when said liquid whole egg is being maintained at a temperature in the range between about 30° F. and about 65° F., an enzyme system having glucose oxidase activity, saturating the liquid admixture with respect to oxygen and to maintaining discharge of gas from said admixture in quantities to maintain foaming throughout the reaction period, whereby particulate material is floatable from the admixture and removable from the system.

3. The process of removing an aldose from liquid whole egg containing fat formable into discrete globules at temperatures in the range between about 30° F. and about 65° F., which comprises admixing with said liquid whole egg when the liquid whole egg is being maintained at a temperature in the range between about 30° F. and about 65° F., hydrogen peroxide and an enzyme system having aldose oxidase and catalase activities, maintaining a concentration of hydrogen peroxide sufficient to keep the admixture essentially saturated with respect to oxygen and maintaining discharge of gas from said admixture in quantities insuring foaming throughout the reaction period, whereby particulate material is floatable from the admixture and removable from the system.

4. The process of removing glucose from liquid egg whites containing fat formable into discrete globules at temperatures in the range between about 30° F. and about 65° F., which comprises admixing with said liquid egg whites when the liquid egg white is being maintained at a temperature in the range between about 30° F. and about 65° F., an enzyme system having glucose oxidase activity, maintaining free oxygen as a dispersed gaseous medium in said admixture, said admixture being maintained essentially saturated with respect to oxygen, and maintaining discharge of gas from said admixture in quantities insuring foaming throughout the reaction period, whereby particulate material is floatable from the admixture and removable from the system.

5. The process of removing glucose from liquid egg whites containing fat formable into discrete globules at temperatures in the range between about 30° F. and about 65° F., which comprises adjusting the pH of said liquid egg white to less than about 8, admixing with said pH adjusted liquid egg white when the pH adjusted egg is being maintained at a temperature in the range between about 30° F. and about 65° F., an enzyme system having glucose oxidase activity, saturating the liquid admixture with respect to oxygen and maintaining discharge of gas from said admixture in quantities to maintain foaming throughout the reaction period, whereby particulate material is floatable from the admixture and removable from the system.

6. The process of removing glucose from liquid egg whites containing fat formable into discrete globules at temperatures in the range between about 30° F. and about 65° F., which comprises admixing said liquid egg whites with hydrogen peroxide and an enzyme system having glucose oxidase and catalase activities, forming free oxygen in situ in said admixture by catalase decomposition of hydrogen peroxide when the liquid egg white is being maintained at a temperature in the range between about 30° F. and about 65° F., maintaining said liquid egg whites essentially saturated with respect to oxygen and during at least a portion of the reaction period causing discharge of gas from said admixture in quantities to maintain a foaming action, whereby particulate material is floatable from the admixture and removable from the system.

7. The process of removing an aldose from liquid egg yolk containing fat formable into discrete globules at temperatures in the range between about 30° F. and about 65° F., which comprises admixing with said liquid egg yolk when said liquid egg yolk is being maintained at a temperature in the range between about 30° F. and about 65° F., an enzyme system having aldose oxidase activity, saturating the liquid admixture with respect to oxygen and maintaining discharge of gas from said admixture in quantities to maintain foaming throughout the reaction period, whereby particulate material is floatable from the admixture and removable from the system.

8. The process of removing an aldose from liquid egg yolk containing fat formable into discrete globules at temperatures in the range between about 30° F. and about 65° F., which comprises admixing with said liquid egg yolk when the liquid egg yolk is being maintained at a temperature in the range between about 30° F. and about 65° F., hydrogen peroxide and an enzyme system having glucose oxidase and catalase activities, maintaining a concentration of hydrogen peroxide sufficient to keep the admixture essentially saturated with respect to oxygen and maintaining discharge of gas from said admixture in quantities insuring foaming essentially throughout the reaction period, whereby particulate material is floatable from the admixture and removable from the system.

References Cited in the file of this patent
UNITED STATES PATENTS 2,744,017     Baldwin _____ May 1, 1956